United States Patent
Filippi et al.

(10) Patent No.: US 10,016,738 B2
(45) Date of Patent: Jul. 10, 2018

(54) HORIZONTAL CATALYTIC REACTOR

(71) Applicant: Casale SA, Lugano (CH)

(72) Inventors: Ermanno Filippi, Castagnola (CH); Enrico Rizzi, Casnate con Bernate (IT)

(73) Assignee: Casale SA, Lugano (CH)

(*) Notice: Subject to any disclaimer, the term of this patent is extended or adjusted under 35 U.S.C. 154(b) by 62 days.

(21) Appl. No.: 15/324,982

(22) PCT Filed: Jun. 19, 2015

(86) PCT No.: PCT/EP2015/063862
§ 371 (c)(1),
(2) Date: Jan. 9, 2017

(87) PCT Pub. No.: WO2016/005170
PCT Pub. Date: Jan. 14, 2016

(65) Prior Publication Data
US 2017/0189874 A1 Jul. 6, 2017

(30) Foreign Application Priority Data
Jul. 10, 2014 (EP) .................... 14176494

(51) Int. Cl.
*B01J 8/00* (2006.01)
*B01J 8/02* (2006.01)

(52) U.S. Cl.
CPC ........... *B01J 8/0285* (2013.01); *B01J 8/0214* (2013.01); *B01J 2208/0015* (2013.01); *B01J 2208/022* (2013.01)

(58) Field of Classification Search
CPC .............. B01J 8/0285; B01J 8/0214

USPC ......................................... 422/198
See application file for complete search history.

(56) References Cited

U.S. PATENT DOCUMENTS

| 5,746,976 A * | 5/1998 | Yamada ................. G01D 11/24 422/547 |
| 6,676,906 B1 | 1/2004 | Heisel |
| 8,202,917 B2 * | 6/2012 | Espinoza ............... B01J 8/0221 422/148 |

FOREIGN PATENT DOCUMENTS

| EP | 0958858 A2 | 11/1999 |
| EP | 1153653 A1 | 11/2001 |
| WO | 2009/056488 A1 | 5/2009 |
| WO | 2010/014217 A1 | 2/2010 |

OTHER PUBLICATIONS

International Search Report issued in connection with PCT/EP2015/063862.
International Preliminary Report on Patentability issued in connection with PCT/EP2015/063862.

* cited by examiner

*Primary Examiner* — Huy Tram Nguyen
(74) *Attorney, Agent, or Firm* — Akerman LLP

(57) ABSTRACT

Horizontal reactor (1) for catalytic reactions, comprising an outer cylindrical shell (2), a catalytic bed (5) and heat exchange plates (6) immersed in said catalytic bed, parallel to each other and supplied with a heat exchange fluid; said reactor comprises a container (7) for said catalytic bed (5) and said plates (6), said container is extractable slidably from said shell, by means of at least one linear guide (31, 32, 45) extended longitudinally with respect to said shell (2).

16 Claims, 4 Drawing Sheets

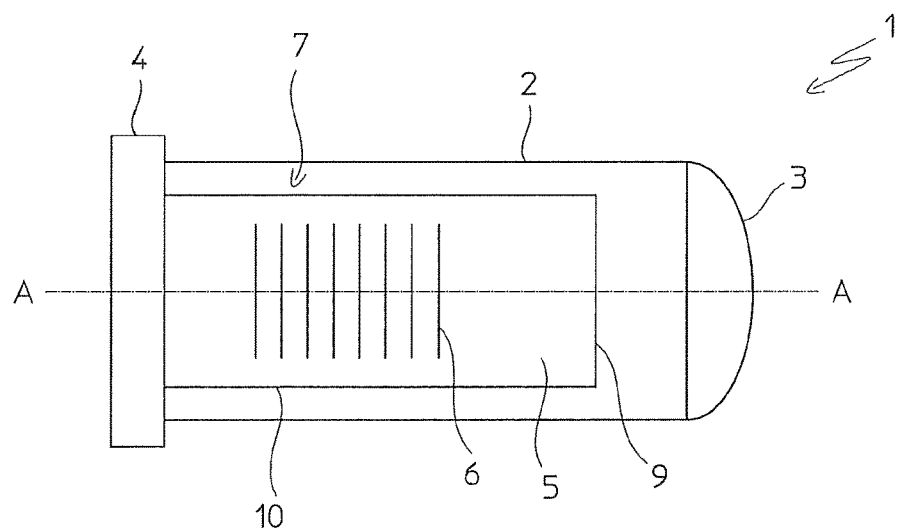
Fig. 1
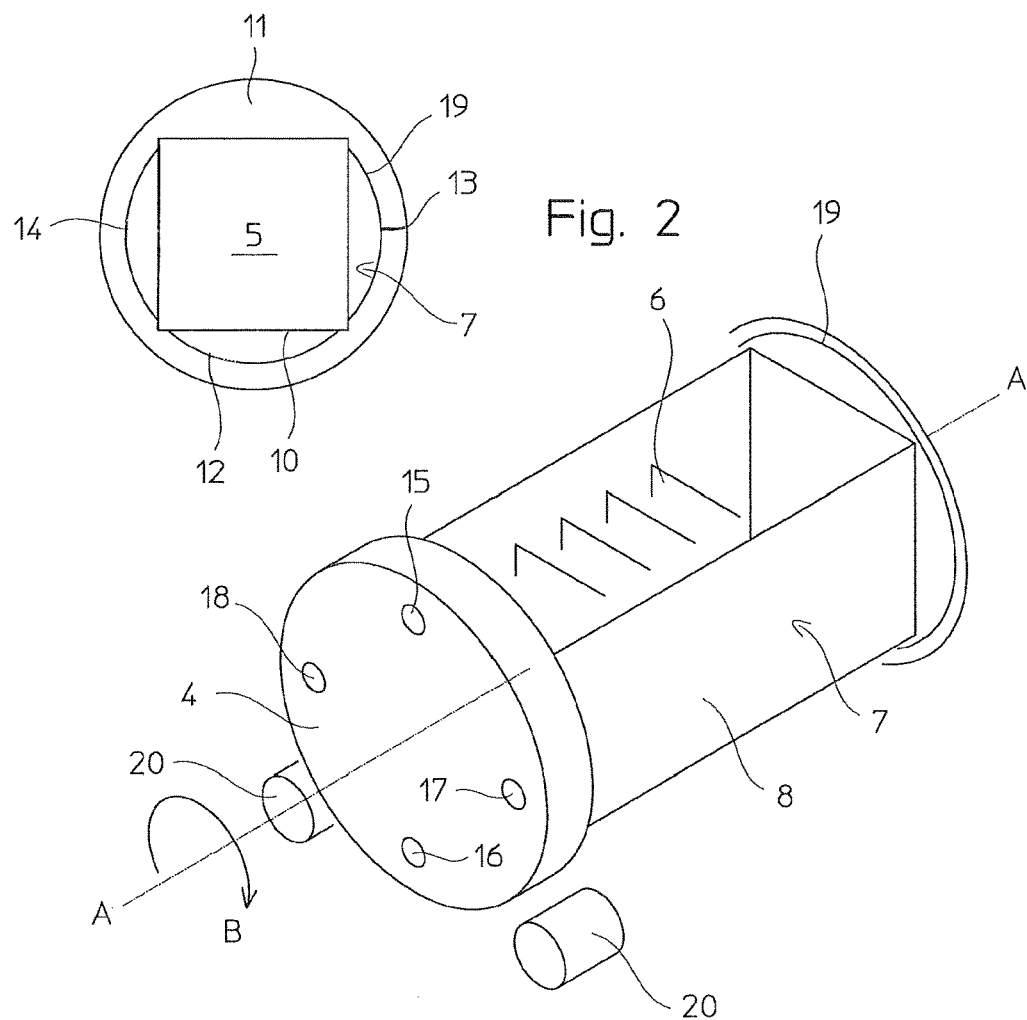
Fig. 2
Fig. 3

HORIZONTAL CATALYTIC REACTOR

This application is a national phase of PCT/EP2015/063862, filed Jun. 19, 2015, and claims priority to EP 14176494.4, filed Jul. 10, 2014, the entire contents of both of which are hereby incorporated by reference.

FIELD OF APPLICATION

The present invention relates to a catalytic reactor. In particular, the invention relates to a catalytic reactor of the so-called plate type, i.e. comprising heat exchange plates immersed in the catalytic bed.

PRIOR ART

Reactors comprising a catalytic bed and a heat exchanger immersed in the bed are known. Said reactors are called isothermal or near isothermal reactors because the exchanger keeps the temperature of the bed at a substantially constant value or within a predetermined range, supplying or removing heat in the case of an endothermic or exothermic reaction, respectively. The heat exchange elements may be formed by a tube bundle or by plates. An isothermal catalytic reactor containing heat exchange plates is described, for example, in EP 1,153,653.

Different methods of arranging the plates inside the catalytic bed are known. In vertical reactors, for example, a radial arrangement of the plates is generally preferred; the radial arrangement, however, has the disadvantage of a variable distance between the walls of adjacent plates, which are farther from each other at the periphery of the reactor. Consequently, the heat exchange is not uniform and is less efficient towards the periphery of the reactor, i.e. far from the axis.

In reactors intended for highly exothermic reactions, it is desirable that the distance between the plates is small and constant, so as to allow a uniform extraction of heat and avoid local overheating of the bed and consequent damaging of the catalyst. Therefore in these reactors a reactor configuration with parallel cooling plates is generally preferred both in horizontal-axis reactors and in vertical-axis reactors. U.S. Pat. No. 6,676,906 (Heisel) for example describes a horizontal reactor comprising parallel cooling plates inside a catalytic bed.

Horizontal plate-type reactors have, however, the drawback of poor accessibility to the interior, including the heat exchange plates and the associated headers. Moreover the operations for loading and unloading the catalyst into/from a horizontal reactor are less easy than in vertical reactors. The poor accessibility increases the downtimes of the reactor and therefore the costs for the replacement of the catalyst as well as for the periodic maintenance operations.

SUMMARY OF THE INVENTION

The invention aims to overcome these drawbacks and provide a horizontal plate-type reactor, in particular for exothermic reactions, with easier access to the interior and with easier loading and unloading of the catalyst.

The object is achieved with a horizontal-axis reactor according to the claims.

The reactor comprises an outer cylindrical shell, at least one catalytic bed and a plurality of heat exchange plates immersed in said catalytic bed, the plates being parallel to each other and passed through internally by a heat exchange fluid, and is characterized by a container for said catalytic bed and said plates, which can be extracted slidably on at least a first guide with respect to said shell.

Advantageously, the container can also be inclined with respect to said shell, starting from an extracted position. Preferably, the container can be inclined through 180 degrees, thus being able to be overturned with respect to the normal operating position. In the extracted position the inclination movement of the container is also guided by the shell, along at least one second guide, referred to as an inclination or overturning guide.

The container essentially has a first degree of freedom represented by a linear extraction movement from the shell, and a second degree of freedom represented by the inclination or overturning movement. Both said movements are suitably guided by the cylindrical shell of the reactor.

Preferably said first guide is formed by one or more longitudinal rails, for example a pair of parallel rails which form a track. The container of the catalytic bed may be slidable for example on wheels or the like. In some embodiments, the container of the bed can be extracted on a proper frame or carriage.

Various configurations are possible within the scope of the invention for the overturning guide.

In a first embodiment, the container is extractable on a first guide and a second guide which are parallel to each other; said container is hinged with one of said two guides, for example with the first guide, and can be disengaged from the other guide, for example from the second guide. In this way, once the container is disengaged from the second guide, it may rotate about the first guide with which it is hinged.

In a second embodiment, the reactor comprises a frame extractable from the shell, advantageously on two guides provided with wheels or sliders. The container containing the catalytic bed and the plates is associated with said frame and, more particularly, is hinged on one side of the frame. Preferably it is also provided with a device for locking rotation of the container with respect to the frame. After extracting the frame from the shell and freeing the locking device, the container may be rotated or overturned.

Other embodiments are possible within the scope of the invention. For example, in a third embodiment, the reactor comprises at least one overturning guide which extends along a circumferential arc of the shell.

In a fourth embodiment, the container of the bed may be associated with a framework or cage which is rotatable with respect to the shell so as to obtain the desired degree of freedom of inclination or overturning movement.

The cover or closing flange of the reactor during the inclination or overturning movement rests preferably on proper external rollers.

Advantageously, said container has the form of a box bounded by two side walls, an end wall and a gas-permeable bottom wall and has a top side which is open, or provided with a gas-permeable cover, for example a perforated cover.

In a particularly advantageous embodiment, the container is fixed to a flanged cover of the reactor. Advantageously, said cover is formed by a flange of the full opening type, which has substantially the same diameter as the cylindrical shell of the reactor.

According to a preferred aspect of the invention, the inlet and outlet connections both for the shell side and for the plate inner side, as well as any headers for the gas (shell side) and for the heat exchange fluid (plate side) are associated solely with said cover.

The cover, the container of the catalytic bed and the respective headers thus form a unit or cartridge which can be extracted from the reactor. Said unit or cartridge comprises: the reactor cover, the catalytic bed container, the heat exchange plates, the headers for the heat exchange fluid, the header or the headers for the reagent gases and/or the products, if provided.

Such an embodiment reduces to a minimum the piping for connection to the exterior, since all the connections are associated with the cover. Once said connections with the exterior are removed, the unit is freely extractable from the reactor.

The shell side connections comprise an inlet for the reagents and an outlet for the products, respectively communicating with the inlet and outlet of the catalytic bed. In a preferred embodiment, only one between said inlet and said outlet comprises a header, joined to the reactor cover and isolated from the remaining internal volume of the reactor (between the shell and the bed container); the other between said inlet and said outlet has no header and communicates with the internal volume of the reactor.

Preferably, the header system is specifically designed for the reagents flowing out of the catalytic bed, while the gas inlet is without header. Consequently, the incoming gas spreads freely inside the reactor, between the shell and the bed container, and enters the catalytic reaction zone for example passing through a cover of the said container which is suitably gas-permeable.

An embodiment without an incoming gas header is advantageous because it allows the construction of the extractable catalytic bed reactor to be significantly simplified. In fact, it is not required to remove any header from the top part of the bed, once the container is extracted. This arrangement is, moreover, particularly advantageous in the case of exothermic reactions, since the cold incoming gas flows over the walls of the pressure vessel and cools it. For endothermic reactions it is possible to provide a configuration in which, vice versa, only the incoming gas is supplied to a header, with the effect of heating the catalytic bed by means of the reaction products which, in this way, flow into the space around the said bed.

It can be understood that the extractable and inclinable container according to the invention allows an easy access to the interior of the reactor and in particular, an easy replacement of the catalyst.

The catalyst, for example, may be poured into the container, when it is in a position extracted from the shell, via a sieve or other means which ensures uniform distribution thereof. Unloading of the exhaust catalyst is performed by extracting the container and rotating or overturning it through 180 degrees. A container for the exhaust catalyst may also be replaced by removing the old container and inserting a new container, with fresh catalyst, prepared beforehand. In this way it is possible to reduce to the minimum the downtimes of the reactor, and if necessary of the plant, for replacement of the catalyst.

It should also be noted that the movements of the container are guided by the proper guides on the shell, thereby favouring safe operations.

A reactor according to the invention is particularly suitable for exothermic reactions, and more particularly for use as a reactor for the synthesis of formaldehyde.

Further characteristic features and advantages of the reactor according to the present invention are illustrated in the description below of a number of embodiments, with reference to examples and the attached drawings.

BRIEF DESCRIPTION OF THE FIGURES

FIG. 1 shows a diagrammatic longitudinal section of a plate-type reactor according to an embodiment of the invention.

FIG. 2 shows a diagrammatic cross-section of the reactor of FIG. 1.

FIG. 3 shows a simplified axonometric view of the catalytic bed and the respective container extracted from the reactor of FIG. 1.

DETAILED DESCRIPTION OF A NUMBER OF PREFERRED EMBODIMENTS

Figure 4:
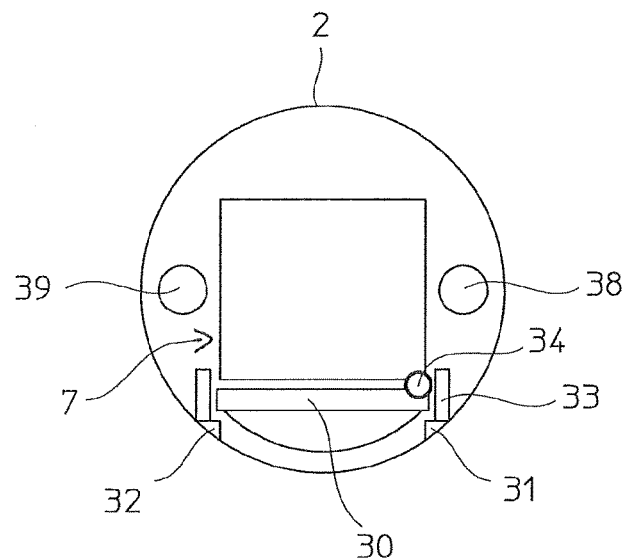
FIG. 4 is a simplified cross-section of a reactor according to one of the embodiments of the invention, in which the catalytic bed is associated with a sliding frame.

FIG. 1 shows a diagram of a horizontal reactor 1 which comprises a cylindrical shell 2, with axis A-A, enclosed by a base 3 welded to the shell 2 and by a full-opening cover 4 which is flanged together with the shell 2.

The reactor 1 further comprises a catalytic bed 5 which extends substantially along the entire length of the reactor and has a square or rectangular section. A plurality of parallel heat-exchange plates 6 are immersed in the catalytic bed 5. Said plates 6 are supplied with a heat exchange fluid which circulates inside the said plates 6.

The plates 6 may be made using a technique known per se and are not described here in detail. For example, said plates 6 comprise two walls which are juxtaposed and parallel to each other, being welded along the perimetral edge, and may also comprise internal ducts for the heat exchange fluid. Said ducts may be defined, for example, by joining lines of the plate walls.

The plates 6 are close to each other and arranged vertically and parallel, thus ensuring optimum temperature control (reduction of hot spots) and a high heat exchange. In the embodiment shown the plates 6 are substantially perpendicular to the axis of the reactor 1. In other embodiments the plates 6, although being parallel to each other, may be arranged inclined with respect to the reactor axis.

The shell side of the reactor 1 is passed through by gaseous reagents and products, which flow across the catalytic bed 5 passing inside the spaces between the plates 6; the "plate side" (i.e. the inside of the plates 6) is passed through for example by a fluid which may be a gas or a liquid. In some embodiments said fluid may be a phase-changing fluid, for example a liquid evaporating in the case of an exothermic reaction or a vapour condensing in the case of an endothermic reaction.

The catalytic bed 5 and the plates 6 are situated inside a container 7 which is joined together with the flanged cover 4.

Said container 7 typically comprises side walls 8, an end wall 9 opposite to the cover 4, and a bottom wall 10 which is able to retain the catalyst, but which is gas-permeable. Said bottom wall 10 is advantageously formed by a grille, a perforated metal plate or slotted metal plate provided with slots of suitable size and pattern. The container 7 may also comprise a gas-permeable cover, as shown for example in FIG. 8 which will be described below.

FIG. 2 shows that the container 7 with a rectangular cross-section defines in the cylindrical shell 2 an upper circular segment 11 above the bed 5, a lower circular segment 12 below the bed, and two lateral circular segments 13, 14 on the sides of the bed. Said segments 11, 12, 13 and 14 may house headers for supplying and/or collecting the gas circulating in the shell side and the heat exchange fluid circulating in the plates 6, as will be explained below with the aid of the examples.

Preferably the gas flow (shell side) is directed from the top downwards, entering from the top of the bed 5 and exiting through the permeable bottom wall 10. The flow inside the plates 6 is preferably a counter-current flow (from the bottom upwards). If the heat exchange fluid is an evaporating or condensing fluid, advantageously it is possible to use a cross-flow (from right to left or vice versa) inside the plates 6.

The cover 4 houses two first gas inlet and outlet connections 15, 16 which are in communication with the shell side, and two other connections 17 and 18 for a heat exchange fluid, which are in communication with the inside of the plates 6 (FIG. 3).

The container 7 is extractable slidably from the shell 2, by means of suitable guides, in an extraction direction parallel to the axis A-A of the reactor 1. The container 7 may slide axially up to a completely extracted position, where said container 7 is further guided by the shell 2 for an inclination or overturning movement. Said inclination or overturning movement is preferably performed about an axis of rotation which is parallel to or coincides with one of the axial sliding guides, or alternatively coincides with said axis A-A. The rotation about an axis coinciding with one of the guides has the further advantage of unloading the catalyst alongside the reactor 1 instead of underneath the said reactor.

For example in FIG. 3 the container 7 is shown in the position completely extracted from the shell 2, and an overturning guide 19 and rollers 20 for supporting the flange 4 are shown. Once in the extracted position, the container 7 may be inclined following the guide 19 which extends along a circumferential arc of the shell 2; the weight of the flanged cover 4 is supported by at least two rollers 20 on which said cover 4 rests and rotates. The arrow B in FIG. 3 indicates the overturning rotation of the container 7 which occurs preferably about the axis A-A. In this way the container 7 may be inclined, advantageously overturning it through 180 degrees, in order to unload the exhaust catalyst.

Extraction of the container 7 from the shell 2 is made possible by suitable sliding guides joined to the shell 2, for example two rails parallel to the axis A-A (said rails not being shown in FIGS. 1-3).

Figure 5:
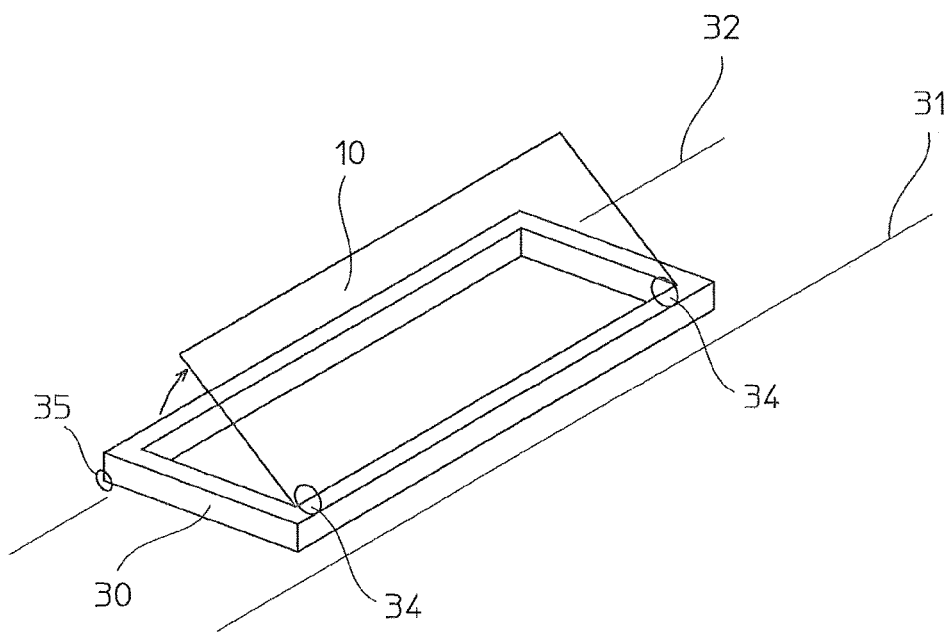
FIG. 5 illustrates diagrammatically the possibility of overturning the catalytic bed container, in the version according to FIG. 4.

FIGS. 4 and 5 show another embodiment in which the container 7 is associated with a frame 30 which acts as a carriage. Said frame 30 in fact is slidable on two parallel rails 31 and 32, on which it rests by means of wheels 33, allowing the extraction.

The container 7 is connected to the frame 30 by hinges 34 which are arranged on one side of the container 7 itself and which allow the inclination or overturning movement. On the opposite side to the side where the hinges 34 are situated, a releasable locking device 35 is provided for keeping the container 7 in the horizontal position.

For greater clarity, FIG. 4 shows only the bottom wall 10 of the container 7. It can be understood that, after extraction from the shell 2 and after release of said locking device 35, the container 7 may be overturned by means of the hinges 34 in order to unload the catalyst, as indicated by the arrow in FIG. 5.

Figure 6:
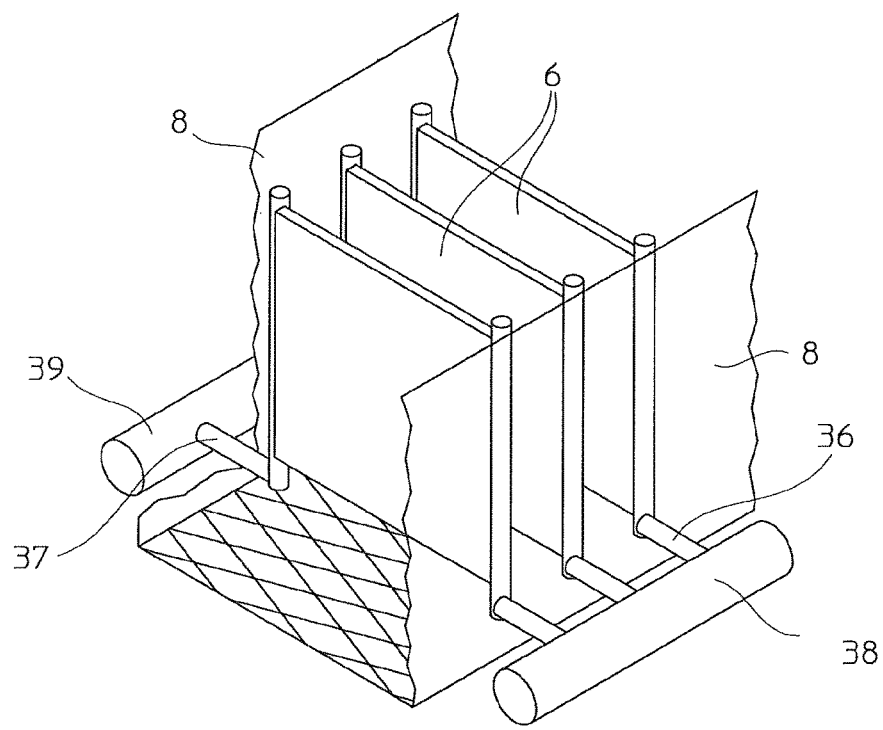
FIG. 6 shows an axonometric view of an embodiment of the plates and the respective pipes for supplying and collecting the heat exchange fluid.
Figure 7:
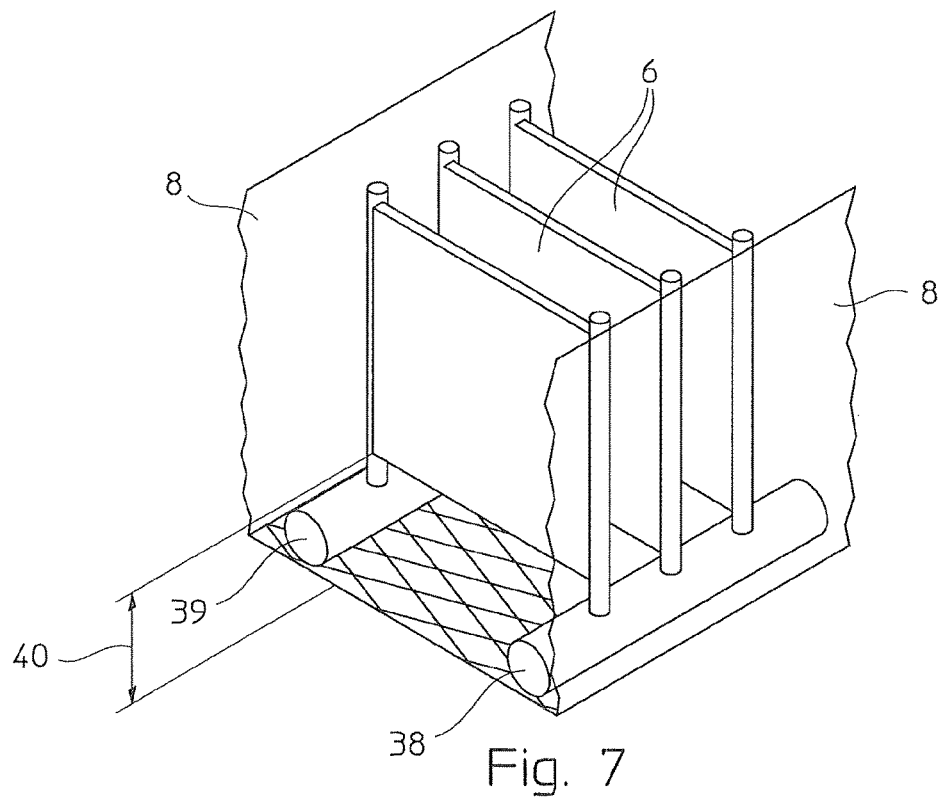
FIG. 7 shows an embodiment of the plates and associated connections, constituting an alternative to that shown in FIG. 6.

FIGS. 6 and 7 show preferred methods for supplying the heat exchange fluid to the plates 6 and for collecting the fluid from the said plates.

The plates 6 are supplied by means of headers 38, 39 communicating respectively with the inlet 17 and the outlet 18 of the heat exchange fluid. Said headers 38, 39 are housed preferably inside the segments 13, 14 in FIG. 2, along the sides of the container 7.

FIG. 6 shows an embodiment in which said plates 6 are connected to the headers 38, 39 by single ducts 36, 37 passing through said walls 8. The inlet header 38 and the outlet header 39 are situated on the outside of the container 7, and the plates 6 are not in contact with said walls 8. Advantageously, each plate 6 has at least one respective inlet duct 36 and at least one respective outlet duct 37.

FIG. 7 shows a variant in which the fluid inlets and outlets of the plates 6 are connected directly to the headers 38, 39 which are situated below the plates 6 and inside the container 7. The ducts 36, 37 are therefore absent in the embodiments of the type shown in FIG. 7.

The headers 38, 39, still with reference to the variant shown in FIG. 7, may be positioned for example underneath a grille which forms the bottom wall 10. In this embodiment, the space 40 remaining between the headers and the bottom edge of the plates 6 is not cooled; in order to avoid problems of non-uniform cooling of the catalyst, said space 40 is advantageously filled with inert material.

The headers 38, 39 may be located at different heights with respect to the plates; for example in FIG. 4, they are shown at half height.

Figure 8:
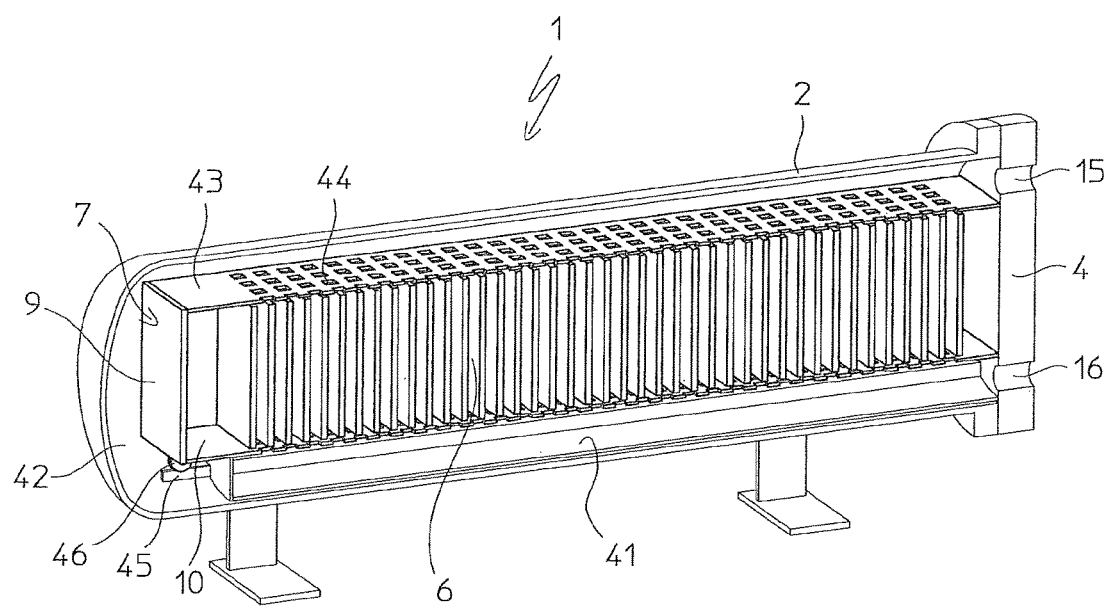
FIG. 8 shows a cross-section of a reactor according to an embodiment of the invention.

FIG. 8 shows a preferred method for supplying and collecting the shell side gases. In particular, FIG. 8 shows a preferred embodiment in which the reactor 1 comprises a single shell-side gas header, in the present case a header 41 which collects the products discharged from the catalytic bed 5.

In greater detail, the inlet 15 of the cover 4 directly communicates with the space 42 between the shell 2 and the container 7; the outlet 16 instead communicates with the inside of said header 41 which is for example a box-shaped body which is closed and is isolated from the space 42.

The container 7 has a cover 43 which is gas-permeable with openings 44 which allow the entry of the reagent gas into the catalyst-containing spaces between the plates 6. The partially or completely converted gas flows out through the bottom wall 10 which is also perforated, and is collected inside the header 41.

An advantage of the embodiment shown in FIG. 8 is that the inlet header for the reagents is eliminated, since the gas entering via the passage 15 fills the entire internal volume of the pressure vessel, available around the container 7, except for the volume occupied by the outlet header 41 for the products and by the headers for supplying and discharging the plates (not visible in FIG. 8). This allows a significant simplification of the structure since the top part of the catalytic bed (i.e. basically the upper segment 11) remains free for the catalyst loading and unloading operations, which are therefore performed rapidly, without the need to remove any header, once the catalytic bed container 7 is extracted.

This arrangement, moreover, is particularly advantageous in the case of exothermic reactions, since the gas entering via the opening 15, which is cold, flows over the walls of the shell 2 and cools them.

In the case of endothermic reactions, instead, it may be preferable to use an embodiment comprising a single header (similar to the header 41) for supplying the fresh gas, allowing the gases leaving the bed to flow inside the surrounding space. In this way flushing of the shell with the cold gas flowing out from the catalytic bed 5 is obtained. In this embodiment, the gas distributor must however be removed in order to replace the catalyst.

FIG. 8 also shows one of the rails 45 on which the container 7 rests by means of wheels 46.

It should be noted that the connections 15, 16, 17 and 18 are housed by the cover 4, which forms the front end of an extractable unit (cartridge) also comprising the container 7, the bed 5 and the plates 6, and the headers 38, 39, 41. This facilitates greatly the operations of opening the reactor and extracting the catalytic bed, because it is sufficient to disassemble the pipes connected to said connections 15, 16, 17 and 18 in order to be able to extract and, if necessary, freely overturn the unit.

The reactor shown in the example operates in the following manner. Reference is made for example to an exothermic reaction. A flow of gaseous reagents enters the reactor 1 via the inlet 15, fills the space 42 (FIG. 8) between the shell 2 and the container 7, and enters the catalytic zone through the openings 44 of the cover 43.

The reagents pass through the bed 5 with a substantially vertical movement from the top downwards. The reaction products flow out of the bed and the container 7 through the bottom wall 10, are collected inside the header 41 and leave the reactor through the outlet 16.

A cooling fluid, for example water, enters by means of the connection 17, is distributed inside the plates 6 by suitable connections (for example as shown in FIG. 6 or FIG. 7) and is collected at the connection 18, flowing out as a heated flow or partially or completely evaporated.

The reactor according to the present invention may be used advantageously, for example, in highly exothermic reactions, and more preferably for the synthesis of formaldehyde.

The invention claimed is:

1. A horizontal reactor for catalytic reactions, comprising a cylindrical outer shell, at least one catalytic bed and a plurality of heat exchange plates immersed in said catalytic bed, the plates being parallel to each other and supplied with a heat exchange fluid inside them, wherein:
the reactor comprises a container which contains said catalytic bed and said plates, said container being slidably extractable from said shell, by means of at least one first linear guide extended longitudinally with respect to said shell,
said container being extractable from the shell up to an extracted position, and said shell comprising at least one second guide for inclining the container starting from said extracted position.

2. The reactor according to claim 1, said container being inclinable starting from a position extracted from the shell, on at least one second overturning guide which extends along a circumferential arc of said shell.

3. The reactor according to claim 1, wherein said container is extractable in a direction of extraction parallel to a longitudinal axis of the reactor, and is inclinable with a rotation with respect to an axis of rotation parallel to, or coincident with, said direction.

4. The reactor according to claim 2, said container being able to be overturned by at least 180 degrees from said extracted position with respect to the shell.

5. The reactor according to claim 1, said container being associated with a frame slidable along at least one linear guide and said container being hinged with said frame.

6. The reactor according to claim 5, wherein said container is hinged with the frame by means of one or more hinges arranged along a hinging side of the container, and is provided with a releasable locking device on the opposite side of said container.

7. The reactor according to claim 1, said container being formed substantially as a box open at the top, and bounded by side walls, an end wall and a bottom wall, said bottom wall being gas-permeable.

8. The reactor according to claim 7, wherein said bottom wall is formed by a grille or by a perforated metal plate provided with slots of suitable size.

9. The reactor according to claim 1, characterized in that said container is fixed to a cover of said reactor, said cover and said container forming a unit which can be extracted and inclined with respect to the shell.

10. The reactor according to claim 9, wherein said cover comprises at least:
one inlet for reagent gases and one outlet for reaction products, which communicate with the shell side of the reactor; at least one inlet and one outlet for a heat exchange fluid, which communicate with the inside of said plates.

11. The reactor according to claim 10, wherein only one between said inlet for reagent gases and said outlet for reaction products is in communication with a header joined to said cover and isolated from the internal volume of the reactor; the other one between said inlet and said outlet not having a header and communicating with the free internal volume of the reactor, present between the shell and the container of the catalytic bed.

12. The reactor according to claim 11, wherein the inlet for the gases is without a header, supplying the reagent gases into said free volume between shell and container of the catalytic bed, the inlet of the catalytic bed being in communication with said free volume, and the outlet of the bed being in communication with a header for collecting the reaction products.

13. The reactor according to claim 12, said container having a top cover and a bottom wall which are both gas-permeable, such that the reagent gases supplied into the free internal volume of the reactor enter the catalytic bed through said cover, and after passing through the catalyst, into the spaces between the plates, are collected inside the said header through said bottom wall.

14. The reactor according to claim 9, comprising at least two headers for supplying a heat exchange fluid to said plates and collecting the fluid leaving said plates, said headers being joined together with said flange.

15. The reactor according to claim 9, said cover being of the full opening type and having a diameter substantially equivalent to the diameter of said cylindrical shell.

16. The reactor according to claim 1, for exothermic reactions and in particular for use as a reactor for the synthesis of formaldehyde.

* * * * *